United States Patent
Chen et al.

(10) Patent No.: US 9,731,384 B2
(45) Date of Patent: Aug. 15, 2017

(54) METHODS AND COMPOSITIONS FOR BRAZING

(71) Applicant: Baker Hughes Incorporated, Houston, TX (US)

(72) Inventors: Wei Chen, Sugar Land, TX (US); Marc W. Bird, Houston, TX (US); John H. Stevens, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 10 days.

(21) Appl. No.: 14/584,663

(22) Filed: Dec. 29, 2014

(65) Prior Publication Data

US 2016/0136762 A1    May 19, 2016

Related U.S. Application Data

(63) Continuation-in-part of application No. 14/546,806, filed on Nov. 18, 2014.

(51) Int. Cl.
*B23K 31/02* (2006.01)
*B23K 35/30* (2006.01)
(Continued)

(52) U.S. Cl.
CPC ........ *B23K 35/3006* (2013.01); *B23K 1/0008* (2013.01); *B23K 1/19* (2013.01); *B23K 35/025* (2013.01); *B23K 35/0222* (2013.01); *B23K 35/0227* (2013.01); *B23K 35/0244* (2013.01); *B23K 35/24* (2013.01); *B23K 35/30* (2013.01);
(Continued)

(58) Field of Classification Search
None
See application file for complete search history.

(56) References Cited

U.S. PATENT DOCUMENTS 3,560,172 A * 2/1971 Kench et al. ............ B23K 1/19
428/593
3,999,962 A   12/1976 Drui et al.
(Continued)

FOREIGN PATENT DOCUMENTS

| CH | 588910 A   * | 6/1977 | |
| DE | 10060136 A1 * | 5/2002 | ............ B26B 25/00 |

(Continued)

OTHER PUBLICATIONS

Chen et al., U.S. Appl. No. 14/546,806 entitled, Methods and Compositions for Brazing, and Earth-Boring Tools Formed From Such Methods and Compositions, filed Nov. 18, 2014.
(Continued)

*Primary Examiner* — Kiley Stoner
(74) *Attorney, Agent, or Firm* — TraskBritt

(57) ABSTRACT

A method includes disposing a braze material adjacent a first body and a second body; heating the braze material and forming a transient liquid phase; and transforming the transient liquid phase to a solid phase and forming a bond between the first body and the second body. The braze material includes copper, silver, zinc, magnesium, and at least one material selected from the group consisting of nickel, tin, cobalt, iron, phosphorous, indium, lead, antimony, cadmium, and bismuth.

23 Claims, 5 Drawing Sheets

(51) Int. Cl.

| | | |
|---|---|---|
| B23K 1/00 | (2006.01) | |
| C22C 5/08 | (2006.01) | |
| C22C 26/00 | (2006.01) | |
| E21B 10/00 | (2006.01) | |
| C22C 5/06 | (2006.01) | |
| C22C 18/00 | (2006.01) | |
| B23K 35/36 | (2006.01) | |
| B23K 35/02 | (2006.01) | |
| B23K 35/24 | (2006.01) | |
| B23K 1/19 | (2006.01) | |
| B22F 1/00 | (2006.01) | |
| B22F 7/06 | (2006.01) | |
| C22C 1/04 | (2006.01) | |
| B23K 101/00 | (2006.01) | |

(52) U.S. Cl.
CPC .............. B23K 35/36 (2013.01); C22C 5/06 (2013.01); C22C 5/08 (2013.01); C22C 18/00 (2013.01); C22C 26/00 (2013.01); E21B 10/00 (2013.01); B22F 1/0003 (2013.01); B22F 1/0059 (2013.01); B22F 7/064 (2013.01); B23K 2201/002 (2013.01); C22C 1/0466 (2013.01); C22C 1/0491 (2013.01)

(56) References Cited

U.S. PATENT DOCUMENTS

| | | | | |
|---|---|---|---|---|
| 4,350,215 A * | 9/1982 | Radtke | ............... | B23K 1/008 175/433 |
| 4,661,180 A * | 4/1987 | Frushour | ............... | B32B 19/04 156/89.25 |
| 4,766,040 A | 8/1988 | Hillert et al. | | |
| 4,919,220 A * | 4/1990 | Fuller | ............... | E21B 10/60 175/433 |
| 5,056,382 A * | 10/1991 | Clench | ............... | B23P 13/02 76/108.2 |
| 5,221,039 A * | 6/1993 | Jung | ............... | B23K 20/16 228/194 |
| 5,234,152 A * | 8/1993 | Glaeser | ............... | B23K 20/023 228/121 |
| H001566 H * | 8/1996 | Azar | ............... | B23P 13/02 76/108.2 |
| 6,027,957 A * | 2/2000 | Merritt | ............... | H01L 23/4827 257/E23.017 |
| 6,044,920 A * | 4/2000 | Massa | ............... | E21B 10/56 175/417 |
| 6,199,747 B1 * | 3/2001 | Cohn | ............... | B23K 20/023 228/119 |
| 6,772,849 B2 * | 8/2004 | Oldham | ............... | B23K 31/025 175/374 |
| 6,918,530 B2 * | 7/2005 | Shinkai | ............... | B23K 1/0008 228/122.1 |
| 7,267,187 B2 * | 9/2007 | Kembaiyan | ............... | B23B 27/148 175/428 |
| 7,381,016 B2 * | 6/2008 | Oles | ............... | B23B 27/065 228/254 |
| 7,389,834 B1 * | 6/2008 | Kembaiyan | ............... | B23K 35/3006 175/435 |
| 7,487,849 B2 * | 2/2009 | Radtke | ............... | E21B 10/5735 175/420.2 |
| 7,673,785 B2 * | 3/2010 | Weaver | ............... | B23K 1/0008 228/135 |
| 7,863,741 B2 | 1/2011 | Ozaki et al. | | |
| 8,777,088 B2 | 7/2014 | Trinh et al. | | |
| 2002/0092895 A1 * | 7/2002 | Blackshear | ............... | B23K 35/001 228/226 |
| 2004/0050909 A1 * | 3/2004 | Renteria | ............... | B22F 1/0003 228/119 |
| 2004/0050912 A1 * | 3/2004 | Spencer | ............... | B23K 20/023 228/194 |
| 2004/0155096 A1 * | 8/2004 | Zimmerman | ............... | B23K 3/06 228/248.1 |
| 2004/0245022 A1 * | 12/2004 | Izaguirre | ............... | B22F 7/06 175/374 |
| 2005/0087371 A1 * | 4/2005 | Kembaiyan | ............... | B23B 27/148 175/435 |
| 2005/0089440 A1 * | 4/2005 | Kembaiyan | ............... | B23B 27/148 420/502 |
| 2005/0098609 A1 * | 5/2005 | Greenhut | ............... | B23K 35/001 228/122.1 |
| 2006/0071053 A1 * | 4/2006 | Garimella | ............... | B23K 1/0018 228/119 |
| 2006/0071056 A1 * | 4/2006 | Das | ............... | B23K 20/02 228/245 |
| 2007/0152026 A1 * | 7/2007 | Suh | ............... | B23K 35/262 228/193 |
| 2008/0035707 A1 * | 2/2008 | Glaeser | ............... | C04B 37/006 228/121 |
| 2008/0096479 A1 * | 4/2008 | Sung | ............... | B24B 53/017 451/539 |
| 2008/0233682 A1 * | 9/2008 | Suh | ............... | H01L 23/3735 438/122 |
| 2009/0004500 A1 * | 1/2009 | Suh | ............... | B23K 35/001 428/576 |
| 2009/0038442 A1 | 2/2009 | Shamburger et al. | | |
| 2009/0038772 A1 | 2/2009 | Kunii et al. | | |
| 2009/0250442 A1 * | 10/2009 | Cavalli | ............... | B23K 20/023 219/117.1 |
| 2010/0075160 A1 | 3/2010 | Chaumat et al. | | |
| 2010/0096043 A1 * | 4/2010 | McCluskey | ............... | B23K 35/262 148/24 |
| 2010/0150767 A1 * | 6/2010 | Dunand | ............... | B22F 3/1103 419/2 |
| 2010/0252616 A1 * | 10/2010 | Shearer | ............... | B22F 1/0003 228/248.1 |
| 2011/0024201 A1 * | 2/2011 | Scott | ............... | B22F 7/004 175/428 |
| 2011/0129687 A1 * | 6/2011 | Ryan | ............... | B23K 20/021 428/636 |
| 2011/0171372 A1 * | 7/2011 | Shearer | ............... | B22F 3/10 427/123 |
| 2011/0220704 A1 * | 9/2011 | Liu | ............... | B23K 35/0238 228/252 |
| 2011/0315315 A1 * | 12/2011 | Garnier | ............... | B23K 20/023 156/285 |
| 2012/0067652 A1 * | 3/2012 | Bellin | ............... | E21B 10/5735 175/434 |
| 2012/0090900 A1 * | 4/2012 | Prajapati | ............... | B23K 1/0008 175/428 |
| 2012/0112201 A1 * | 5/2012 | Otsuka | ............... | B23K 1/0016 257/76 |
| 2012/0228037 A1 * | 9/2012 | Cooley | ............... | B24D 3/10 175/428 |
| 2013/0167451 A1 * | 7/2013 | Lin | ............... | E21B 10/5673 51/309 |
| 2013/0168159 A1 * | 7/2013 | Eyre | ............... | E21B 10/46 175/432 |
| 2013/0255161 A1 * | 10/2013 | Lin | ............... | E21B 10/5676 51/309 |
| 2013/0263519 A1 * | 10/2013 | Lin | ............... | E21B 10/567 51/295 |
| 2013/0270326 A1 * | 10/2013 | Yoon | ............... | B23K 20/02 228/176 |
| 2013/0318884 A1 * | 12/2013 | Lin | ............... | B24D 3/06 51/309 |
| 2014/0002952 A1 * | 1/2014 | McConnell | ............... | B23K 1/0016 361/301.4 |
| 2014/0042212 A1 * | 2/2014 | Shearer | ............... | B23K 35/025 228/248.1 |
| 2014/0120356 A1 * | 5/2014 | Shearer | ............... | C09J 11/02 428/457 |
| 2014/0131898 A1 * | 5/2014 | Shearer | ............... | H01L 24/29 257/783 |
| 2014/0177132 A1 * | 6/2014 | McConnell | ............... | B23K 1/0016 361/305 |
| 2014/0260478 A1 * | 9/2014 | Forbes Jones | ............... | B21J 1/02 72/47 |

(56) References Cited

U.S. PATENT DOCUMENTS

| | | | |
|---|---|---|---|
| 2015/0183063 A1* | 7/2015 | Hong | B22F 3/00 419/1 |
| 2015/0198040 A1* | 7/2015 | Voitic | B23K 1/0008 299/105 |
| 2015/0337671 A1* | 11/2015 | Strock | C22C 29/12 416/241 R |
| 2015/0354284 A1* | 12/2015 | Griffo | B23K 1/0008 175/432 |
| 2016/0024944 A1* | 1/2016 | Suciu | F01D 5/3061 60/805 |
| 2016/0108204 A1* | 4/2016 | Joshi | C08K 3/08 428/557 |
| 2016/0129530 A1* | 5/2016 | Greve | B23K 35/025 75/228 |
| 2016/0136761 A1* | 5/2016 | Chen | B23K 35/24 175/428 |
| 2016/0141266 A1* | 5/2016 | Hong | H01L 24/83 228/248.1 |
| 2016/0151854 A1* | 6/2016 | Zhai | B23K 20/12 219/617 |
| 2016/0151856 A1* | 6/2016 | Cook | B23K 20/16 428/686 |

FOREIGN PATENT DOCUMENTS

| | | | | |
|---|---|---|---|---|
| JP | EP 0541071 A1 * | 5/1993 | | B23B 27/145 |
| JP | 05140769 A * | 6/1993 | | |

OTHER PUBLICATIONS

Cook, III, Grant O., Joining Polycrystalline Cubic Boron Nitride and Tungsten Carbide by Partial Transient Liquid Phase, Theses and Dissertations, Paper 2366, (2010), 261 pages.

MacDonald et al., Transient Liquid Phase Bonding, Annu. Rev. Mater. Sci., vol. 22, (1992), pp. 23-46.

Quintero, Pedra O., Development of a Shifting Melting Point Ag-In Paste Via Transient Liquid Phase Sintering for High Temperature Environments, Dissertation, University of Maryland, (2008), 245 pages.

* cited by examiner

METHODS AND COMPOSITIONS FOR BRAZING

CROSS-REFERENCE TO RELATED APPLICATION

This application is a continuation-in-part of U.S. patent application Ser. No. 14/546,806, filed Nov. 18, 2014, now U.S. Pat. No. 9,687,940, issued Jun. 27, 2017, and titled "Methods and Compositions for Brazing, and Earth-Boring Tools Formed from Such Methods and Compositions," the disclosure of which is incorporated herein by reference in its entirety.

FIELD

Embodiments of the present disclosure relate generally to methods and materials for securing bodies to one another, such as securing cutting elements to earth-boring drill bits.

BACKGROUND

Downhole tools for earth-boring and for other purposes, including rotary drill bits, are commonly used in boreholes or wells in earth formations. Cutting elements used in earth-boring tools often include polycrystalline diamond compact (often referred to as "PDC") cutting elements, which are cutting elements that include cutting faces of a polycrystalline diamond material. Polycrystalline diamond material is material that includes inter-bonded grains or crystals of diamond material.

Cutting elements may be secured to a body, such as to fixed-cutter earth-boring rotary drill bits (also referred to as "drag bits"). Such fixed-cutter bits typically include a plurality of cutting elements fixedly attached to a bit body of the drill bit, conventionally in pockets formed in blades and other exterior portions of the bit body. Other earth boring tools may include rolling-cone earth-boring drill bits, which include a plurality of roller cones attached to bearing pins on legs depending from a bit body. The roller cones may include cutting elements (sometimes called "inserts") attached to the roller cones, conventionally in pockets formed in the roller cones.

Brazing is widely used to join cutting elements to such earth-boring tools and components thereof by means of a braze material (e.g., a filler material) that melts upon heating. The braze material coats the surfaces of materials being joined, cooling and solidifying to form a bond. Braze materials typically wet surfaces of the materials being joined and allow the materials to be joined without changing the physical properties of the materials. Braze materials are conventionally selected to melt at a lower temperature than a melting temperature or temperatures of the materials being joined. During a brazing process, heating and cooling of the materials may take place in the open atmosphere, in a controlled atmosphere furnace, or in a vacuum furnace. Braze materials are often alloys based on metals such as Ag, Al, Au, Cu, Ni, Ti, Pd, Pt, Cr, Zr, Sn, Mn, Li, Cd, and alloys thereof. Brazing can be used effectively to join similar or dissimilar materials (e.g., metals to metals, ceramics to ceramics, and metals to ceramics).

Typically, in a brazing process, a filler metal or alloy is heated to a melting temperature above 800° F. (427° C.) and distributed between two or more close-fitting parts by direct placement of the filler material between the parts. In some embodiments, the filler metal or alloy may be drawn into an interface between the parts by capillary action. At the melting temperature of a braze material, molten braze material interacts with the surfaces of the parts, cooling to form a strong, sealed joint. A brazed joint may thus become a sandwich of different layers, and each layer may be metallurgically bonded to one or more adjacent layers.

Brazing cutting elements to an earth-boring tool by conventional methods may cause damage to cutting elements, due to the temperatures required to melt braze material. Furthermore, removal or repositioning of cutting elements brazed to a tool typically requires high temperatures, which can cause further damage to cutting elements or to the tool body.

BRIEF SUMMARY

In some embodiments, a method includes disposing a braze material adjacent a first body and a second body; heating the braze material and forming a transient liquid phase; and transforming the transient liquid phase to a solid phase and forming a bond between the first body and the second body. The braze material includes copper, silver, zinc, magnesium, and at least one material selected from the group consisting of nickel, tin, cobalt, iron, phosphorous, indium, lead, antimony, cadmium, and bismuth.

In certain embodiments, a braze material includes copper, silver, zinc, magnesium, and at least one material selected from the group consisting of nickel, tin, cobalt, iron, phosphorous, indium, lead, antimony, cadmium, and bismuth.

In some embodiments, a method includes disposing a braze material between a first body and a second body. The braze material includes a first composition and a second composition. The first composition has a first melting point, and the second composition has a second melting point higher than the first melting point. The method also includes heating the braze material to a third temperature higher than the first melting point and lower than the second melting point and forming a transient liquid phase; and maintaining the braze material above the first melting point for a period of time, transforming the transient liquid phase to a solid phase, and forming a bond between the first body and the second body.

In some embodiments, a braze material for securing solid bodies includes a first composition and a second composition. The first composition exhibits a first melting point and includes at least one element selected from the group consisting of indium, tin, zinc, and magnesium. The second composition exhibits a second melting point higher than the first melting point. A solid solution of the first composition and the second composition exhibits a melting point between the first melting point and the second melting point.

In some embodiments, an earth-boring tool includes a first body, a second body, and a braze material bonding the second body to the first body. The braze material includes silver, copper, at least one element selected from the group consisting of nickel and titanium, and at least one element selected from the group consisting of indium, tin, zinc and magnesium.

In other embodiments, an earth-boring tool includes a first body, a second body, and a braze material bonding the second body to the first body. The braze material includes silver, copper, zinc, magnesium, and at least one element selected from the group consisting of nickel and titanium.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

FIG. 3 is a two-element Ag—In phase diagram illustrating phases of materials at equilibrium as a function of temperature and mass fraction of In;

DETAILED DESCRIPTION

Figure 1A:
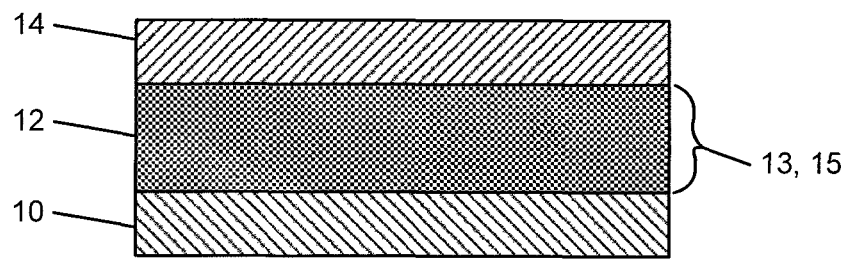
FIGS. 1A through 1C are simplified cross-sectional views illustrating bodies to be brazed and braze materials between the bodies, according to the present disclosure.

The illustrations presented herein are not meant to be actual views of any particular cutting element, earth-boring tool, or component thereof, but are merely idealized representations that are employed to describe example embodiments. Thus, the drawings are not necessarily to scale and relative dimensions may have been exaggerated or understated for the sake of clarity. Additionally, elements common between figures may retain the same or similar numerical designation.

The term "earth-boring tool" as used herein, means and includes any type of tool used for drilling during the formation or enlargement of a wellbore in a subterranean formation. In some embodiments, earth-boring tools include earth-boring drill bits, such as fixed-cutter bits, rolling-cone bits, impregnated bits, core bits, eccentric bits, bicenter bits, and hybrid bits. In some embodiments, earth-boring tools include reamers, mills, and other drilling tools known in the art.

As used herein, the term "polycrystalline material" means and includes any structure comprising a plurality of grains (i.e., crystals) of material (e.g., superhard material) that are bonded directly together by inter-granular bonds. The crystal structures of the individual grains of the material may be randomly oriented in space within the polycrystalline material.

As used herein, the terms "inter-granular bond" and "interbonded" mean and include any direct atomic bond (e.g., covalent, metallic, etc.) between atoms in adjacent grains of superabrasive material.

As used herein, the term "tungsten carbide" means and includes any material composition that contains chemical compounds of tungsten and carbon, such as WC, $W_2C$, and combinations of WC and $W_2C$. Tungsten carbide includes, for example, cast tungsten carbide, sintered tungsten carbide, and macrocrystalline tungsten carbide.

As used herein, the teen "diamond" means and includes any material composition that contains an allotrope of carbon wherein the carbon atoms are arranged in a diamond lattice structure, typically characterized by a tetrahedral bond structure. Diamond includes, for example, natural and synthetic diamonds and polycrystalline and monocrystalline diamond.

As used herein, the term "braze material" means and includes any material for attaching two or more adjacent parts to one another by at least partially melting and resolidifying the braze material.

As used herein, the term "liquidus" means and includes a temperature above which a material is completely liquid at thermal equilibrium. The term "solidus" means and includes a temperature below which the material is completely solid at thermal equilibrium. At temperatures between a material's solidus and liquidus, the material exists as a mixture of solid and liquid when at thermal equilibrium. For pure substances (e.g., a pure metal), the solidus and liquidus are the same temperature, which may be referred to as the "melting point." When the term "melting point" is used herein for any material in which the liquidus and solidus are not identical, "melting point" refers to the solidus, or the point at which a solid begins to melt during heating. The terms "melting range" and "solidification range" of a material mean and include the temperatures between and including the material's solidus and liquidus.

Methods of bonding bodies include disposing a braze material between a first body and a second body, heating the braze material to a brazing temperature, and maintaining the brazing temperature of the braze material for a period of time to solidify the braze material and form a bond between the first body and the second body. The braze material includes a first composition having a first melting point and a second composition having a second, higher melting point. The brazing temperature at which the braze material is held may be higher than the first melting point and lower than the second melting point, such that during brazing, the first composition melts and the second composition does not. During the bonding process, the first and second compositions may mix to form an alloy having a melting point above the brazing temperature. More specifically, the atoms of the liquid phase formed upon melting the first composition may diffuse into the second composition, and/or one or both of the bodies being bonded, until the liquid phase is at least substantially converted to a solid phase. Thus, the braze material may solidify even before any cooling occurs, or at least before the bodies and compositions cool to a temperature at or below the first melting point of the first composition.

FIG. 1A is a simplified cross-sectional view of a portion of a first body 10, a braze material 12, and a second body 14 before the first body 10 is bonded to the second body 14. The first body 10 may be, for example, a bit body, a reamer, a roller cone, a substrate of a cutting element, etc. The first body 10 may include one or more metals, such as iron-based steel, another alloy, a metal-matrix composite, tungsten carbide, etc. The second body 14 may include a polycrystalline material, such as diamond, cubic boron nitride, tungsten carbide, etc. For example, the second body 14 may be a cutting element that includes a polycrystalline material over (e.g., bonded to) a supporting substrate. In some embodiments, the second body 14 may be a cutting element including a polycrystalline diamond table bonded to a cemented tungsten carbide substrate.

The braze material 12 may include a first composition 13 and a second composition 15 selected to form a mixture upon brazing. The compositions 13, 15 may include metals and alloys. In some embodiments, the first composition 13 has a relatively lower solidus or melting point than the second composition 15. For example, the first composition 13 may begin to melt at a temperature of less than about 700° C., less than about 650° C., less than about 600° C., or even less than about 550° C. In some embodiments, the second composition 15 may have a solidus or melting point of at least about 600° C., at least about 700° C., or even at least about 750° C.

In some embodiments, the first composition 13 may be a commercially pure metal such as indium (In), zinc (Zn), tin (Sn), selenium (Se), bismuth (Bi), antimony (Sb), lead (Pb), etc. The second composition 15 may be, for example, an alloy including one or more of nickel (Ni), cobalt (Co), iron (Fe), silver (Ag), copper (Cu), magnesium (Mg), titanium (Ti), manganese (Mn), or other metals. Either the first composition 13 or the second composition 15, or both, may include other materials. For example, the first composition 13 may include boron (B), which tends to depress the melting point (solidus) of alloys. In some embodiments, the first composition 13 may be a mixture of low-melting-point elements, such as Zn alloyed with Bi, Cd, In, Mg, Sn, and/or Pb. A first composition 13 so formulated may exhibit a melting point even lower than the melting point of its major elemental ingredients. Additional alloying may improve processing and/or the physical properties of the resulting braze material.

The braze material 12 may be disposed between the first body 10 and the second body 14. The braze material 12 may be in contact with one or each of the first body 10 and the second body 14. The braze material 12 or the compositions 13, 15 thereof may be in the form of a mixture of materials, which may be a moldable solid (e.g., a flux or a paste), a solid having a preformed shape (e.g., a powder, a thin sheet (e.g., a foil), a wire, or any form as known in the art of brazing and not described in detail herein. The braze material 12 may be applied by disposing the compositions 13, 15 adjacent to and between the first body 10 and the second body 14. For example, the braze material 12 may be pressed to fit the shape of the first body 10 or the second body 14, sprayed onto the first body 10 or the second body 14, etc., and the first body 10 and second body 14 may be positioned with the braze material 12 between and in contact with both the first body 10 and the second body 14. In some embodiments, the braze material 12 may be applied as a filler for repair of a previously formed joint.

Figure 1B:
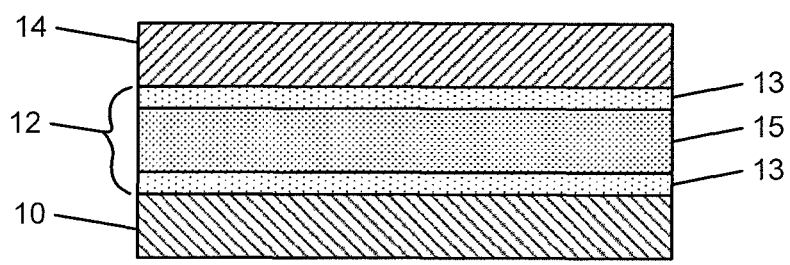
Figure 1C:
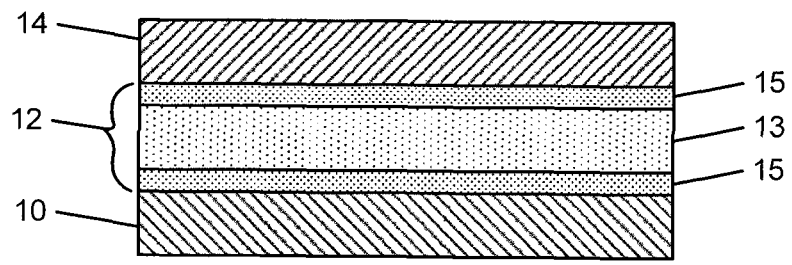

In some embodiments, the compositions of the braze material 12 may be relatively uniformly admixed in a volume between the first body 10 and the second body 14. For example, the braze material 12 may be a mixture of particles of the composition 13 and particles of the second composition 15. In other embodiments, and as depicted in FIG. 1B, each composition of the braze material 12 may be arranged in a layer or discrete volume. For example, the compositions of the braze material 12 may be formed on or over the first body 10 and/or the second body 14 in layers. In some embodiments, portions of the first composition 13 of the braze material 12 may be disposed in contact with each of the first body 10 and the second body 14, and the second composition 15 may be disposed between the portions of the first composition 13. In other embodiments, the arrangement of the first and second compositions 13, 15 may be reversed, as shown in FIG. 1C. In certain embodiments, the first composition 13 may be in contact with the first body, and the second composition 15 may be in contact with the second body (or vice versa). In other embodiments, the first and second compositions 13, 15 may form additional layers (e.g., four layers, five layers, six layers, etc.). If the first and second compositions 13, 15 form layers, each layer may have a thickness, for example, from about 5 µm to about 2 mm, from about 100 µm to about 1 mm, or from about 200 µm to about 500 µm.

The first composition 13 of the braze material 12 may be present in an amount low enough that the first composition 13 does not cause incipient melting of the second composition 15. For example, the first composition 13 may comprise less than about 35% by weight of the braze material 12, less than about 30% by weight of the braze material 12, less than about 25% by weight of the braze material 12, or even less than about 20% by weight of the braze material 12.

The first and/or second compositions 13, 15 of the braze material 12 may be in the form of particulate material. For example, the first composition 13 may include particles having a first average particle size (e.g., from about 1 µm (micron) to about 15 µm) and the second composition 15 may include particles having a second average particle size (e.g., from about 25 µm to about 100 µm). One or both of the first and second compositions 13, 15 may have average particle sizes from about 1 nm (nanometer) to about 100 µm, such as from about 30 nm to about 1 µm, from about 100 nm to about 500 nm, from about 1 µm to about 50 µm, or from about 5 µm to about 30 µm. The average particle sizes may be selected to improve material handling, processing, packing fraction, or other properties. Average particle sizes, as well as the distribution or range of particle sizes, can affect the density, heat transfer properties, and other properties of the braze material 12.

Figure 2:
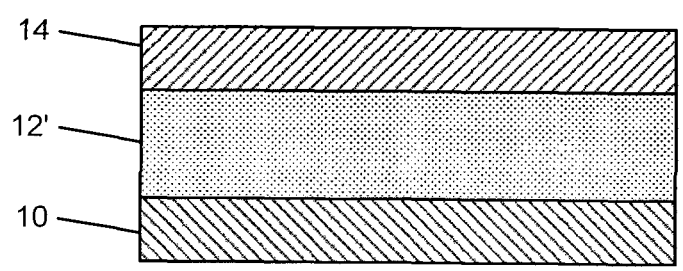
FIG. 2 is a simplified cross-sectional view illustrating the bodies of any of FIGS. 1A through 1C after brazing.

The first body 10, braze material 12, and second body 14 may be heated to a temperature above a solidus or melting point of the first composition 13 of the braze material 12. The first composition 13 may then begin to melt, forming a transient liquid phase, without melting the second composition 15. In some embodiments, the temperature may be maintained above a liquidus of the first composition 13. The atomic elements of the molten first composition 13 may diffuse into the second composition 15, forming a modified braze 12', as shown in FIG. 2, which may be completely solid. The modified braze 12' may be a solid solution or alloy. The modified braze 12' may have a liquidus between the liquidus of the first composition 13 and the solidus of the second composition 15. The modified braze 12' may have a higher solidus than the temperature at which the modified braze 12' is held to melt the first composition 13. Thus, the modified braze 12' may undergo a phase change to form a solid phase bonded to the first body 10 and the second body 14 without melting the second composition 15. Therefore, a mixture of low- and high-melting-point materials (compositions 13 and 15) processed at relatively low temperatures may form a relatively high-melting-point joint (i.e., the modified braze 12'). In some embodiments, the modified braze 12' may be a homogeneous or substantially homogeneous material. In other embodiments, the modified braze 12' may have a composition gradient (e.g., a volume of relatively higher concentration of a certain species and another volume of relatively lower concentration of that species). In other embodiments, the modified braze 12' may contain small particulate materials formed in-situ or ex-situ providing additional strength to the brazed joint.

Low-temperature processing may allow for more precise gap control (i.e., control of the spacing between the two bodies, 10, 14) and better control of the temperature profile (i.e., it may be relatively easier to precisely control a furnace at lower temperatures than at higher temperatures, allowing consistent formation of robust joints). Low-temperature processing may lessen or eliminate the risk of thermal damage to temperature-sensitive bodies (e.g., PDC cutters).

For example, to melt the first composition 13, the braze material 12 may be heated to a temperature from about 200° C. to about 500° C., such as from about 200° C. to about 300° C., from about 300° C. to about 400° C., from about 400° C. to about 500° C., or from about 350° C. to about 450° C. After the phase change, the modified braze 12' may exhibit a melting temperature (a solidus, or temperature above which the modified braze 12' begins to melt) of at least about 550° C., such as at least about 600° C., or at least about 650° C.

Processing times for the braze material 12 may be related to the processing temperatures, and processing times may be relatively longer than processing times used for conventional braze materials. Without being bound to any particular theory, diffusion is believed to be relatively slower at lower processing temperatures than at higher processing temperatures. For example, if the first composition 13 consists essentially of Zn (having a melting point of about 419° C.), complete sintering of the braze material 12 may occur within about 4 hours to 5 hours at a processing temperature of about 449° C. to about 489° C. If the first composition 13 comprises a mixture of Zn and Mg having a solidus of about 369° C., complete sintering of the braze material 12 may occur at a processing temperature of about 399° C. to about 439° C., but may occur over a relatively longer period of time, such from about 8 hours to 10 hours.

The braze material 12 may be heated in controlled steps in an inert atmosphere. For example, the braze material 12 may be heated in a vacuum or in an environment pressurized with an inert gas (e.g., argon, nitrogen, helium, etc.). Pressure of up to about 1 MPa, up to about 5 MPa, up to about 10 MPa, or even up to about 30 MPa may be maintained throughout the heating process.

Figure 3:
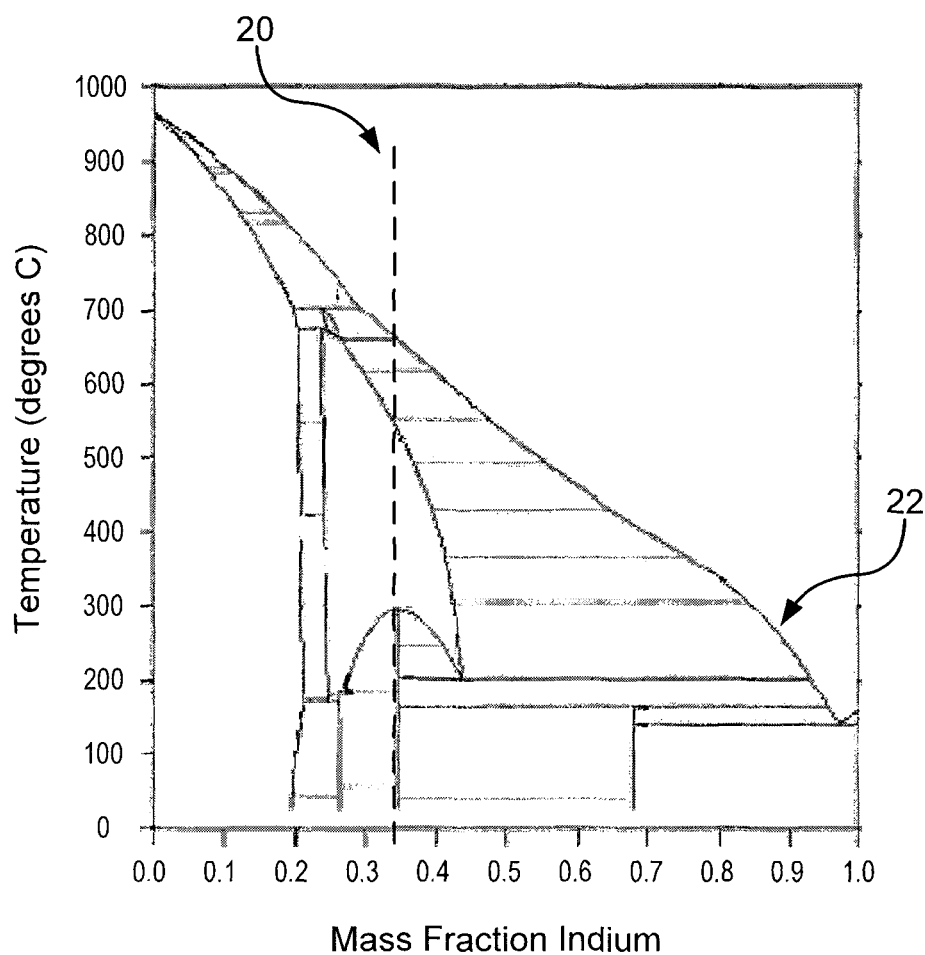

FIG. 3 is a two-element Ag—In phase diagram, illustrating phases of materials at equilibrium as a function of temperature and mass fraction of In (with the balance being Ag). Though the braze material 12 disclosed herein may have additional elements, a two-element phase diagram is helpful to illustrate the principle of a phase change that may occur when heating the braze material 12. For example, a mixture of about 33% In by mass and about 67% Ag by mass is indicated by a dashed vertical line 20. In FIG. 3, points in the area above a liquidus 22 are liquids, and points in the area below the liquidus 22 are phases including one or more solids. If the In and Ag are mixed together as discrete solids (e.g., solid particles), the In exhibits a melting point of about 157° C. and the Ag exhibits a melting point of about 962° C. Thus, heating a mixture of 33% In and 67% Ag will cause the In to melt before the Ag melts (i.e., at about 157° C.). The melted In may diffuse into and around the particles of solid Ag, and may form one or more phases having higher melting points. At equilibrium, as long as the temperature of the mixture is below the intersection of the vertical line 20 with the liquidus 22, the In at least partially solidifies with Ag as solid phase(s). The solid phase(s) have higher liquidus and solidus than the melting point of pure In and lower liquidus and solidus than the melting point of pure Ag. Therefore, the process of forming the solid phase(s) may be carried out at a temperature lower than the melting point of Ag, and even at a temperature lower than the solidus of the mixture ultimately formed.

During the phase change, the modified braze 12' may form solids substantially free of intermetallic compounds. As used herein, the term "intermetallic compound" means and includes a solid phase having more than one metal element in a fixed stoichiometry, with the atoms of each metal arranged in an ordered crystalline structure. Intermetallic compounds may include compounds of relatively high-melting-point elements (e.g., Co, Ni, Fe, etc.) with relatively low-melting-point elements (e.g., In, Sn, etc.). For example, intermetallic compounds may include $Ni_3Sn$, $Ni_3In$, $FeSn$, $FeSn_2$, $CoSn$, $CoSn_2$ or $Co_3Sn_2$, etc. Avoiding intermetallic compounds in the modified braze 12' may reduce or eliminate embrittlement of the modified braze 12' or the formation of a diffusion barrier.

In other embodiments, the braze material may be processed in such a manner to form intermetallic compounds. For example, the presence of particles of intermetallic compounds having controlled particle sizes and distributions may enhance the strength of a braze material. In such embodiments, it may be beneficial to form particles of intermetallic compounds (e.g., as part of the second composition 15) before heating the braze material 12. Particles of intermetallic compounds may remain stable during heating of the braze material 12. The type, amount, or particle size of intermetallic compounds may be controlled to balance various properties, such as strength, brittleness, or the formation or properties of a diffusion barrier.

In some embodiments, other materials may be added to the braze material 12, either as part of the first composition 13, the second composition 15, or both. For example, nanoparticles such as carbides, oxides, borides, etc. (e.g., tungsten carbide, aluminum oxide), may be added to strengthen the braze material 12 without interfering with the bonding of the braze material 12 to the first body 10 and the second body 14.

Because the braze materials disclosed herein may be applied at a lower temperature than conventional braze materials, it may be relatively easier to braze bodies together with the disclosed braze materials than with conventional braze materials. Furthermore, because working temperatures may be lower than for conventional braze materials, thermal damage to tools during brazing may be less likely.

The trend toward homogenization of the braze material 12 during joining (i.e., the brazing process) relies on the kinetics of solid-liquid and/or solid-state diffusion. The kinetics may vary based on factors such as temperature, time, particle sizes, shapes of interfaces (e.g., planar or spherical), cleanliness and uniformity of the braze material and the bodies to be bonded, atmosphere (e.g., oxygen level), and pressure. Diffusion is typically faster for powder mixtures having curved inter-particle interfaces than for mixtures having comparably sized planar interfaces between particles. Diffusion is typically faster for powder mixtures having smaller particle sizes than for powder mixtures having larger particle sizes.

In some embodiments, braze material is heated to a temperature higher than the initial brazing temperature (i.e., the temperature at which the braze material 12 is held to cause a phase change), and held at the higher temperature to make the braze material 12 more homogeneous.

Brazing methods and compositions described herein may have properties suitable to meet reheating and strength requirements of downhole tools and drill bits. In some embodiments, an earth-boring tool includes a first body, a second body, and a braze material bonding the second body to the first body. The braze material may include a solid mixture of a first composition and a second composition, as described above. The solid mixture may exhibit a melting point (solidus) between a melting point of the first composition and a melting point of the second composition.

Figure 4:
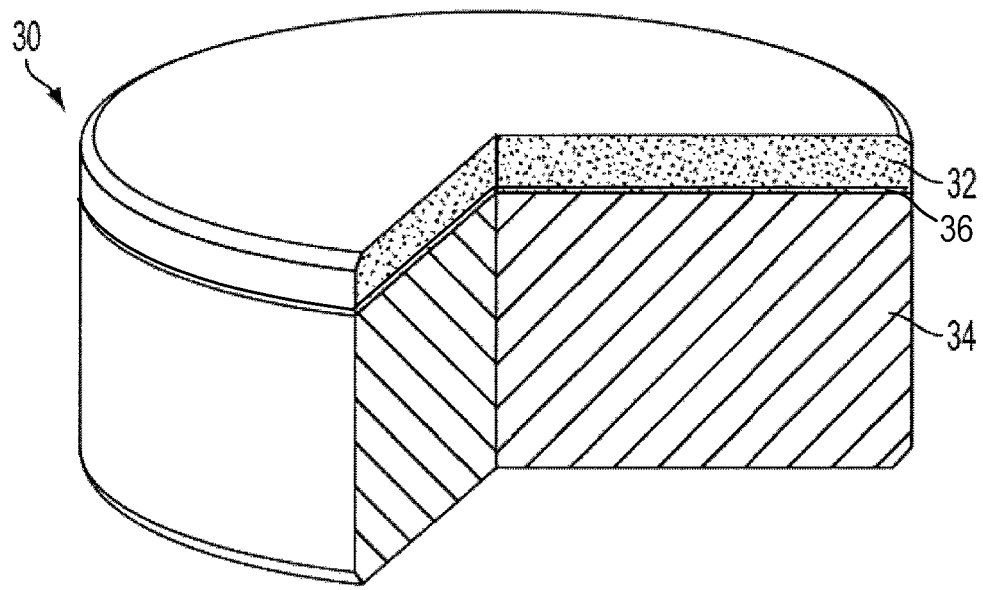
FIG. 4 is a partial cutaway perspective view of a cutting element.

In some embodiments, and as shown in FIG. 4, a cutting element 30 includes a polycrystalline material 32 bonded to a substrate 34 by a braze material 36. In some embodiments, the braze material 36 may be the modified braze 12' described above and shown in FIG. 2. Thus, the polycrystalline material 32 may correspond to the first body 10 shown in FIG. 2, and the substrate 34 may correspond to the second body 14 shown in FIG. 2. The polycrystalline material 32 may include, for example, a diamond table, cubic boron nitride, or any other hard polycrystalline material. The substrate 34 may include, for example, cobalt-cemented tungsten carbide. The braze material 36 may have a melting temperature (a solidus, or temperature above which the braze material 36 begins to melt) of at least about 550° C., such as at least about 600° C., or at least about 650° C., after the brazing process.

Figure 5:
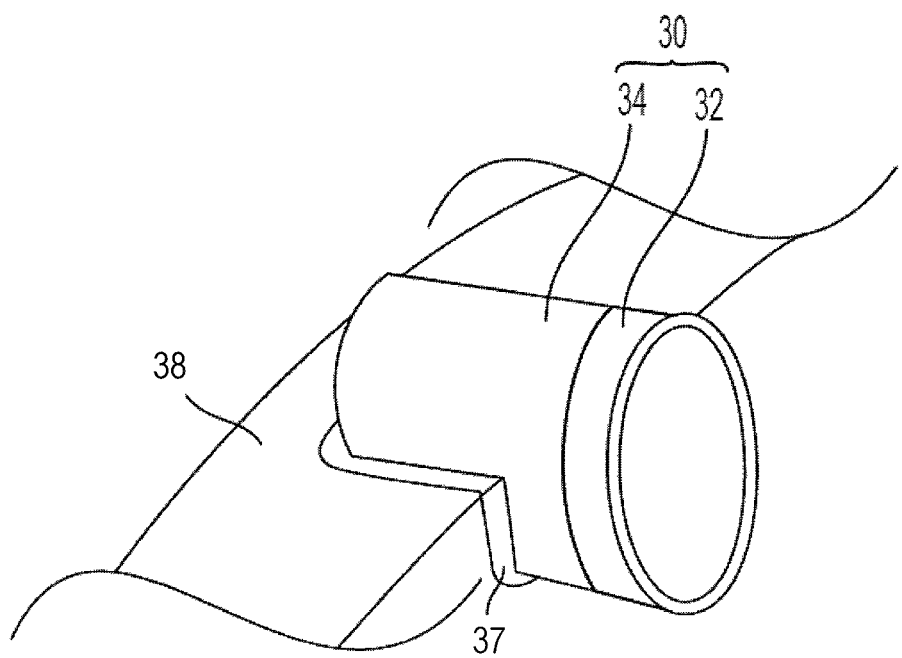
FIG. 5 is a perspective view of a cutting element secured to a body.

As shown in FIG. 5, a cutting element 30 may be secured to a body 38 of an earth-boring tool by braze material 37. The braze material 37 may be the modified braze 12' described above and shown in FIG. 2, and may be the same or different from the braze material 36 shown in FIG. 4.

Figure 6:
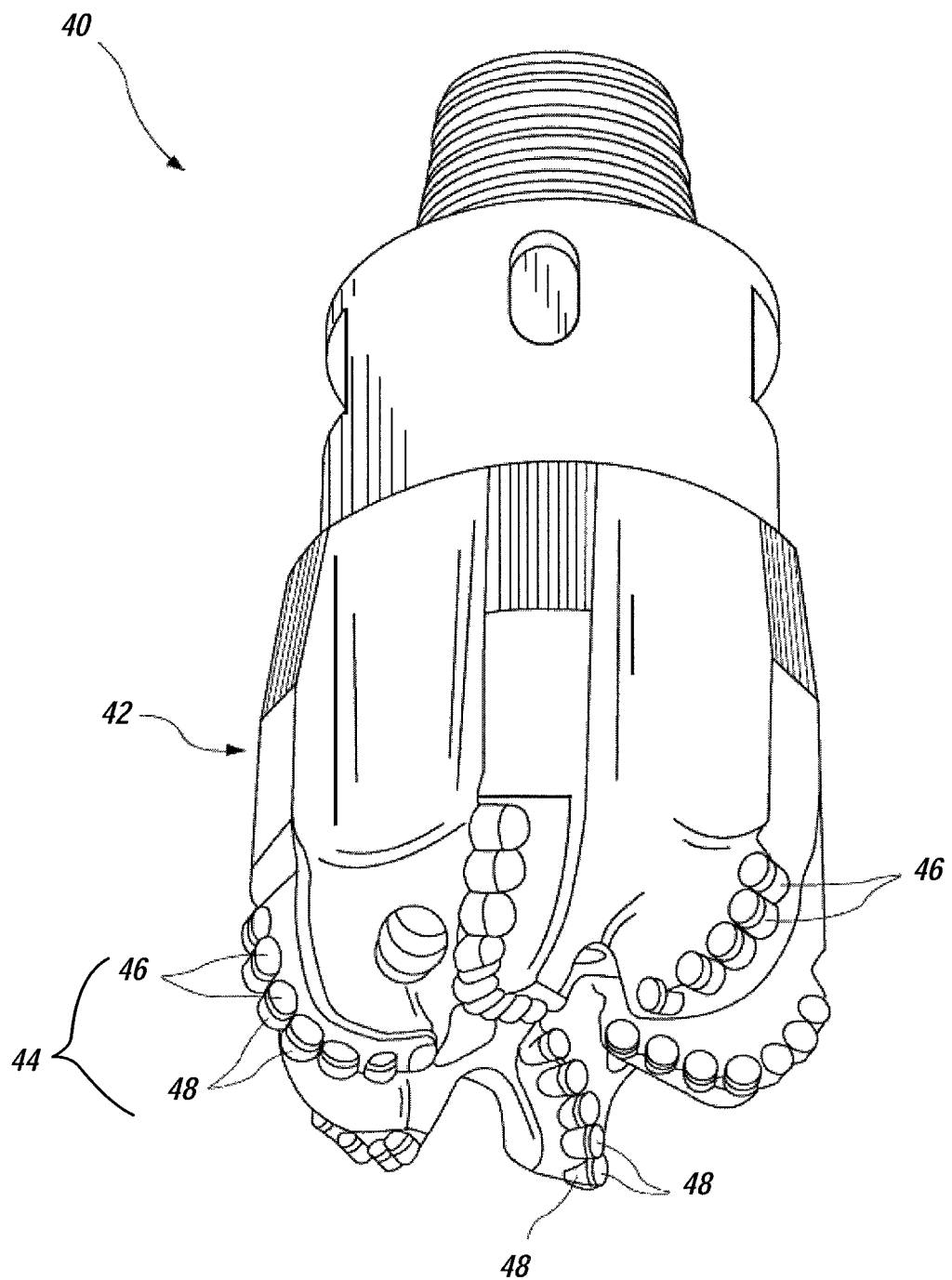
FIG. 6 is a perspective view of an earth-boring drill bit.

In some embodiments, and as shown in FIG. 6, an earth-boring bit 40 includes a bit body 42 and a plurality of cutting elements 44 secured to the bit body 42. The cutting elements 44 may include a polycrystalline material 46 secured to a substrate 48, such as the cutting elements 30 shown in FIG. 4 and described above. In some embodiments, the cutting elements 44 may include any cutting elements known in the art. The cutting elements 44 may be secured to the bit body 42 by a braze material, such as the modified braze 12' described above and shown in FIG. 2. Thus, in the earth-boring bit 40 of FIG. 6, the bit body 42 may correspond to the first body 10 shown in FIG. 2, and the cutting elements 44 may correspond to the second body 14 shown in FIG. 2. The bit body 42 may include, for example, steel, a metal-matrix composite (e.g., cobalt-cemented tungsten carbide), or any other material known in the art. The braze material may have a melting temperature (a solidus, or temperature above which the braze material begins to melt) of at least about 550° C., such as at least about 600° C., or at least about 650° C., after the brazing process.

In some embodiments, braze material (e.g., the modified braze 12' shown in FIG. 2, the braze material 36 shown in FIG. 4, or the braze material 37 shown in FIG. 5) may be heated to weaken a bond. For example, heating the modified braze 12' may cause the modified braze 12' to soften, enabling separation of the first body 10 from the second body 14. Such a process may be used to separate a polycrystalline material 32 from a substrate (see FIG. 4), to separate a cutting element 30 from a body 38 (see FIG. 5), or to separate a cutting element 44 from a bit body 42 (see FIG. 6). Such separations may be beneficial for repair or retooling of earth-boring bits. For example, cutting elements 44 (FIG. 6) that have been damaged or that have experienced a predetermined amount of wear may be removed and replaced before an earth-boring bit 40 is returned to service. Because the braze material as disclosed herein may begin to soften and/or melt at a lower temperature than conventional braze materials, such separations may be relatively easier to perform than conventionally brazed tools. Furthermore, because working temperatures may be lower than for the conventional braze materials, thermal damage to tools during repair and retooling may be less likely to occur.

In some embodiments, braze material may be heated to a temperature of at least about 500° C., such as at least about 550° C., or at least about 600° C., to soften the braze material sufficient to separate bodies. The temperature may be maintained below temperatures at which thermal damage to the brazed bodies occurs (e.g., about 700° C., about 650° C., or even about 600° C. for some types of cutting elements). Though the braze material may not flow to the extent conventional braze materials flow when reheated, the braze material may nonetheless soften enough to allow manipulation and separation of brazed bodies. Upon separation of brazed bodies, a remnant of the braze material may remain on one or both bodies. The remnant may be removed by reheating and/or resurfacing the body. In some embodiments, a remnant of braze material may be left on the body, and another body may be brazed over the remnant by applying additional braze material, during which the remnant of braze material may bond with or mix with the additional braze material.

Methods and materials described herein may be used with various compositions formulated to exhibit desired strength or other properties. By selectively alloying relatively lower-melting-point materials during brazing, brazing may be performed at relatively lower temperatures without sacrificing bond strength.

In some embodiments, a barrier material may be disposed over a surface of one or more of the bodies to be joined to limit or prevent reactions of the compositions of the braze material with the material of the bodies. For example, a barrier material may comprise a carbide coating, as described in U.S. Pat. No. 7,487,849, issued Feb. 10, 2009, titled "Thermally Stable Diamond Brazing," the entire disclosure of which is hereby incorporated by this reference.

The brazing processes may be performed in a furnace or any other means known in the art for heating. In some embodiments, the braze material may be heated locally, such as by a torch, an electric discharge, etc. In general, furnace heating may provide relatively easier temperature control, and may be relatively more efficient.

One of the potential risks of using low-melting-point metals in a braze material in contact with a steel body (e.g., a steel bit body) or cemented tungsten carbide may be referred to in the art as "liquid metal attack." In liquid metal attack, selective leaching of high-melting-point elements by low-melting-point liquid may lead to grain boundary damage to the body. The degree of damage is typically a function of time, temperature, and solubility of the high-melting-point element in the liquid. One method of limiting the effect of liquid metal attack is to select braze materials having low solubility in material of the bodies to be brazed. For example, indium has relatively low solubility in cobalt and iron, so indium may be selected as a low-melting-point composition of a braze for bonding a cobalt-containing body (e.g., cobalt-cemented tungsten carbide) to an iron-containing body (e.g., steel).

The braze materials disclosed herein may have a relatively narrow solidification range, defined as the range between the liquidus and the solidus. Wide solidification ranges, as may be common in conventional braze materials, tend to form relatively weaker joints, and tend to be relatively more susceptible to temperature extremes during manufacturing or use. Narrower solidification ranges of the disclosed braze materials may correspond to relatively stronger joints and greater resistance to temperature extremes, other factors being equal. In some embodiments disclosed herein, the braze materials have solidification ranges of about 150° C. or less, about 100° C. or less, or even about 50° C. or less.

Alloy systems with In or Sn as melting point depressants tend to have relatively large solidification ranges, and the solidus tends to be quite low (e.g., below 500° C.). Large solidification ranges and lower solidus make such materials undesirable for braze alloys for PDC bonding. However, when combined with Zn, both In and Sn reduce the melting point of Zn further. Therefore, either Zn—In or Zn—Sn alloyed with Ag—Cu—Ni may form an alloy system useful for earth-boring tools.

EXAMPLES

Example 1

A braze composition is prepared from two compositions: an alloy precursor and a low-melting-point constituent. The alloy precursor, corresponding to the second composition 15 in FIGS. 1A through 1C, is a 5-element alloy as shown in Table 1. The low-melting-point constituent, corresponding to the first composition 13 in FIGS. 1A through 1C, is commercially pure Zn. The compositions are mixed in a ratio of about 73% alloy precursor to 27% low-melting-point constituent. The compositions may be mixed together with a binder (e.g., an organic material formulated to leave no residue deleterious to a joint) to form a paste. The binder is not included in percentages shown in Table 1 because the binder is expected to be removed from the braze composition during brazing.

TABLE 1

| | Composition (wt. %) | | | | | |
|---|---|---|---|---|---|---|
| | Alloy | | | | | |
| | Ag | Cu | Zn | Ni | Mg | Particle Size |
| Alloy Precursor | 82.2 | 6.8 | 5.5 | 2.7 | 2.7 | 1 to 15 μm |
| Low-melting-point Constituent | — | — | 100.0 | — | — | −325 mesh |
| Braze Composition | 60.0 | 5.0 | 31.0 | 2.0 | 2.0 | |

For the braze composition in Table 1, the predicted liquidus is approximately 630° C. The predicted solidus is approximately 590° C.

Example 2

A braze composition is prepared from two compositions: an alloy precursor and a low-melting-point constituent. The alloy precursor, corresponding to the second composition 15 in FIGS. 1A through 1C, is a 5-element alloy as shown in Table 2. The low-melting-point constituent, corresponding to the first composition 13 in FIGS. 1A through 1C, is commercially pure Zn. The compositions are mixed in a ratio of about 75% alloy precursor to 25% low-melting-point constituent. The compositions may be mixed together with a binder (e.g., an organic material formulated to leave no residue deleterious to a joint) to form a paste. The binder is not included in percentages shown in Table 2 because the binder is expected to be removed from the braze composition during brazing.

TABLE 2

| | Composition (wt. %) | | | | | |
|---|---|---|---|---|---|---|
| | Alloy | | | | | |
| | Ag | Cu | Zn | Ti | Mg | Particle Size |
| Alloy Precursor | 78.0 | 11.3 | 5.3 | 2.7 | 2.7 | 1 to 15 μm |
| Low-melting-point Constituent | — | — | 100.0 | — | — | −325 mesh |
| Braze Composition | 58.5 | 8.5 | 29.0 | 2.0 | 2.0 | |

For the braze composition in Table 2, the predicted liquidus is approximately 630° C. The predicted solidus is approximately 538° C.

Example 3

A braze composition is prepared from two compositions: an alloy precursor and a low-melting-point constituent. The alloy precursor, corresponding to the second composition 15 in FIGS. 1A through 1C, is a 4-element alloy as shown in Table 3. The low-melting-point constituent, corresponding to the first composition 13 in FIGS. 1A through 1C, is commercially pure Zn. The compositions are mixed in a ratio of about 72% alloy precursor to 28% low-melting-point constituent. The compositions may be mixed together with a binder (e.g., an organic material formulated to leave no residue deleterious to a joint) to form a paste. The binder is not included in percentages shown in Table 3 because the binder is expected to be removed from the braze composition during brazing.

TABLE 3

| | Composition (wt. %) | | | | | |
|---|---|---|---|---|---|---|
| | Alloy | | | | | |
| | Ag | Cu | Zn | In | Ni | Particle Size |
| Alloy Precursor | 70.8 | 25.0 | | 2.8 | 1.4 | 1 to 15 μm |
| Low-melting-point Constituent | — | — | 100.0 | — | — | −325 mesh |
| Braze Composition | 51.0 | 18.0 | 28.0 | 2.0 | 1.0 | |

For the braze composition in Table 3, the predicted liquidus is approximately 675° C. The predicted solidus is approximately 642° C.

Example 4

A braze composition is prepared from two compositions: an alloy precursor and a low-melting-point constituent. The alloy precursor, corresponding to the second composition 15 in FIGS. 1A through 1C, is a 4-element alloy as shown in Table 4. The low-melting-point constituent, corresponding to the first composition 13 in FIGS. 1A through 1C, is commercially pure Zn. The compositions are mixed in a ratio of about 72% alloy precursor to 28% low-melting-point constituent. The compositions may be mixed together with a binder (e.g., an organic material formulated to leave no residue deleterious to a joint) to form a paste. The binder is not included in percentages shown in Table 4 because the binder is expected to be removed from the braze composition during brazing.

TABLE 4

| | Composition (wt. %) | | | | | |
|---|---|---|---|---|---|---|
| | Alloy | | | | | |
| | Ag | Cu | Zn | In | Ni | Particle Size |
| Alloy Precursor | 72.2 | 20.8 | | 5.6 | 1.4 | 1 to 15 μm |
| Low-melting-point Constituent | — | — | 100.0 | — | — | −325 mesh |
| Braze Composition | 52.0 | 15.0 | 28.0 | 4.0 | 1.0 | |

For the braze composition in Table 4, the predicted liquidus is approximately 686° C. The predicted solidus is approximately 631° C.

Example 5

A braze composition is prepared from two compositions: an alloy precursor and a low-melting-point constituent. The alloy precursor, corresponding to the second composition 15 in FIGS. 1A through 1C, is a 5-element alloy as shown in Table 5. The low-melting-point constituent, corresponding to the first composition 13 in FIGS. 1A through 1C, is commercially pure Zn. The compositions are mixed in a ratio of about 75% alloy precursor to 25% low-melting-point constituent. The compositions may be mixed together with a binder (e.g., an organic material formulated to leave no residue deleterious to a joint) to form a paste. The binder is not included in percentages shown in Table 5 because the binder is expected to be removed from the braze composition during brazing.

TABLE 5

| | Composition (wt. %) | | | | | |
| --- | --- | --- | --- | --- | --- | --- |
| | Alloy | | | | | |
| | Ag | Cu | Zn | Ti | Mg | Particle Size |
| Alloy Precursor | 78.7 | 12.0 | 5.3 | 2.0 | 2.0 | 1 to 15 μm |
| Low-melting-point Constituent | — | — | 100.0 | — | — | −325 mesh |
| Braze Composition | 59.0 | 9.0 | 29.0 | 1.5 | 1.5 | |

For the braze composition in Table 5, the predicted liquidus is approximately 630° C. The predicted solidus is approximately 590° C.

Additional non-limiting example embodiments of the disclosure are described below.

Embodiment 1

A method comprising disposing a braze material between a first body and a second body. The braze material comprises a first composition and a second composition, the first composition having a first melting point and the second composition having a second melting point higher than the first melting point. The method further comprises heating the braze material to a third temperature higher than first melting point and lower than the second melting point and forming a transient liquid phase; and maintaining the braze material above the first melting point for a period of time, transforming the transient liquid phase to a solid phase, and forming a bond between the first body and the second body.

Embodiment 2

The method of Embodiment 1, wherein the second composition comprises an alloy.

Embodiment 3

The method of Embodiment 2, wherein the second composition comprises an alloy comprising at least one element selected from the group consisting of silver, copper, manganese, nickel, titanium, cobalt, and aluminum.

Embodiment 4

The method of any of Embodiments 1 through 3, wherein the first composition comprises at least one element selected from the group consisting of indium, tin, zinc, and magnesium.

Embodiment 5

The method of any of Embodiments 1 through 4, wherein solidifying the transient liquid phase comprises forming a solid substantially free of intermetallic compounds.

Embodiment 6

The method of any of Embodiments 1 through 5, wherein disposing a braze material between the first body and the second body comprises disposing a paste comprising at least a composition of the braze material between the first body and the second body.

Embodiment 7

The method of any of Embodiments 1 through 6, wherein disposing a braze material between the first body and the second body comprises disposing a thin sheet comprising at least a composition of the braze material between the first body and the second body.

Embodiment 8

The method of any of Embodiments 1 through 7, wherein heating the braze material to a third temperature higher than first melting point and lower than the second melting point comprises heating the braze material to a temperature in a range extending from about 200° C. to about 600° C.

Embodiment 9

The method of any of Embodiments 1 through 8, further comprising, after the bonded first body and second body are used in an application, heating the solidified braze material to a fourth temperature to weaken the bond between the first body and the second body.

Embodiment 10

The method of Embodiment 9, wherein heating the solidified braze material to a fourth temperature to weaken the bond between the first body and the second body comprises heating the solidified braze material to a temperature in a range extending from about 600° C. to about 800° C.

Embodiment 11

The method of Embodiment 9 or Embodiment 10, further comprising separating the first body from the second body.

Embodiment 12

The method of any of Embodiments 1 through 11, wherein disposing a braze material between a first body and a second body comprises disposing the braze material between polycrystalline diamond and a metal body.

Embodiment 13

The method of any of Embodiments 1 through 12, wherein disposing a braze material between a first body and a second body comprises disposing a braze material between a polycrystalline material and a metal matrix composite.

Embodiment 14

The method of any of Embodiments 1 through 13, wherein disposing a braze material between a first body and a second body comprises disposing a first volume of the second composition adjacent and in contact with the first body, disposing a second volume of the second composition adjacent and in contact with the second body, and disposing a volume of the first composition adjacent and in contact with the first volume and second volume of the second composition.

Embodiment 15

A braze material comprising a first composition and a second composition. The first composition exhibits a first melting point and includes at least one element selected from the group consisting of indium, tin, zinc, and magnesium. The second composition exhibits a second melting point higher than the first melting point. A solid solution of the first composition and the second composition exhibits a melting point between the first melting point and the second melting point.

Embodiment 16

The braze material of Embodiment 15, wherein the first composition comprises an element selected from the group consisting of indium and tin.

Embodiment 17

The braze material of Embodiment 15 or Embodiment 16, wherein the second composition comprises at least one element selected from the group consisting of silver, copper, manganese, nickel, titanium, cobalt, and aluminum.

Embodiment 18

The braze material of Embodiment 15, wherein the first composition comprises indium and the second composition comprises nickel and cobalt.

Embodiment 19

The braze material of Embodiment 15, wherein the first composition comprises tin and the second composition comprises nickel and cobalt.

Embodiment 20

The braze material of any of Embodiments 15 through 19, wherein the first composition comprises a first plurality of particles, and the second composition comprises a second plurality of particles interspersed with the first plurality of particles.

Embodiment 21

The braze material of any of Embodiments 15 through 19, wherein the first composition comprises a first layer of material and the second composition comprises a second layer of material.

Embodiment 22

The braze material of any of Embodiments 15 through 21, further comprising an organic binder material.

Embodiment 23

The braze material of any of Embodiments 15 through 22, wherein the braze material comprises from about 50% to about 70% silver by weight and from about 4% to about 20% copper by weight.

Embodiment 24

The braze material of any of Embodiments 15 through 22, wherein the braze material comprises from about 20% to about 35% elements selected from the group consisting of indium, tin, zinc, and magnesium by weight.

Embodiment 25

An earth-boring tool, comprising a first body, a second body, and a braze material bonding the second body to the first body. The braze material comprises silver, copper, at least one element selected from the group consisting of nickel and titanium, and at least one element selected from the group consisting of indium, tin, zinc, and magnesium.

Embodiment 26

An earth-boring tool, comprising a first body, a second body, and a braze material bonding the second body to the first body. The braze material comprises silver, copper, zinc, magnesium, and at least one element selected from the group consisting of nickel and titanium.

Embodiment 27

The earth-boring tool of Embodiment 25 or Embodiment 26, wherein the braze material comprises a solid substantially free of intermetallic compounds.

Embodiment 28

The earth-boring tool of any of Embodiments 25 through 27, wherein the first body comprises a bit body.

Embodiment 29

The earth-boring tool of Embodiment 28, wherein the bit body comprises a metal matrix material.

Embodiment 30

The earth-boring tool of any of Embodiments 25 through 29, wherein the second body comprises a polycrystalline material.

Embodiment 31

The earth-boring tool of Embodiment 30, wherein the polycrystalline material comprises polycrystalline diamond.

Embodiment 32

The earth-boring tool of Embodiment 31, wherein the polycrystalline diamond comprises a diamond table, and wherein the first body comprises a tungsten carbide substrate.

Embodiment 33

The earth-boring tool of Embodiment 30, wherein the polycrystalline material comprises cubic boron nitride.

Embodiment 34

A method comprising disposing a braze material adjacent a first body and a second body; heating the braze material and forming a transient liquid phase; and transforming the transient liquid phase to a solid phase and forming a bond between the first body and the second body. The braze material comprises copper, silver, zinc, magnesium, and at least one material selected from the group consisting of nickel, tin, cobalt, iron, phosphorous, indium, lead, antimony, cadmium, and bismuth.

Embodiment 35

The method of Embodiment 34, wherein disposing a braze material adjacent a first body and a second body comprises disposing a braze material comprising at least one intermetallic compound adjacent the first body and the second body.

Embodiment 36

The method of Embodiment 34 or Embodiment 35, wherein disposing a braze material adjacent a first body and a second body comprises disposing a braze material comprising a plurality of particles adjacent the first body and the second body.

Embodiment 37

The method of Embodiment 36, wherein disposing a braze material comprising a plurality of particles adjacent the first body and the second body comprises disposing a braze material comprising a plurality of particles having an average particle size in a range from about 1 µm to about 15 µm adjacent the first body and the second body.

Embodiment 38

The method of any of Embodiments 34 through 37, wherein disposing a braze material adjacent the first body and the second body comprises disposing a paste comprising at least a composition of the braze material adjacent the first body and the second body.

Embodiment 39

The method of any of Embodiments 34 through 38, wherein disposing a braze material adjacent the first body and the second body comprises disposing a thin sheet comprising at least a composition of the braze material adjacent the first body and the second body.

Embodiment 40

The method of any of Embodiments 34 through 39, wherein heating the braze material and forming a transient liquid phase comprises heating the braze material to a temperature in a range extending from about 200° C. to about 600° C.

Embodiment 41

The method of any of Embodiments 34 through 40, further comprising, after the bonded first body and second body are used in an application, heating the solidified braze material to weaken the bond between the first body and the second body.

Embodiment 42

The method of Embodiment 41, wherein heating the solidified braze material to weaken the bond between the first body and the second body comprises heating the solidified braze material to a temperature in a range extending from about 600° C. to about 800° C.

Embodiment 43

The method of Embodiment 41 or Embodiment 42, further comprising separating the first body from the second body.

Embodiment 44

The method of any of Embodiments 34 through 43, wherein disposing a braze material adjacent a first body and a second body comprises disposing the braze material adjacent a previously formed joint between the first body and the second body.

Embodiment 45

The method of any of Embodiments 34 through 44, wherein heating the braze material and forming a transient liquid phase comprises heating the braze material for at least about four hours.

Embodiment 46

The method of any of Embodiments 34 through 45, wherein heating the braze material and forming a transient liquid phase comprises heating the braze material in an inert atmosphere.

Embodiment 47

A braze material comprising copper, silver, zinc, magnesium, and at least one material selected from the group consisting of nickel, tin, cobalt, iron, phosphorous, indium, lead, antimony, cadmium, and bismuth.

Embodiment 48

The braze material of Embodiment 47, wherein the braze material comprises metallic particles having an average particle size in a range from about 1 µm to about 15 µm.

Embodiment 49

The braze material of Embodiment 47 or Embodiment 48, further comprising an organic binder.

Embodiment 50

The braze material of any of Embodiments 47 through 49, wherein the braze material comprises a first plurality of metallic particles and a second plurality of metallic particles interspersed with the first plurality of metallic particles.

Embodiment 51

The braze material of Embodiment 50, wherein the first plurality of metallic particles comprises a first material having a first composition and the second plurality of metallic particles comprises a second material having a second composition different from the first composition.

Embodiment 52

The braze material of any of Embodiments 47 through 51, wherein the braze material comprises at least one intermetallic compound.

Embodiment 53

The braze material of any of Embodiments 47 through 52, further comprising nanoparticles comprising at least one material selected from the group consisting of carbides, oxides, and borides.

While the present invention has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention as contemplated by the inventors. Further, embodiments of the disclosure have utility with different and various types and configurations of tools.

What is claimed is:

1. A method, comprising:
   disposing a braze material between a cutting element pocket of a bit body and a cutting element to be disposed in the cutting element pocket, wherein the braze material comprises a first composition having a first melting point and a second composition having a second melting point lower than the first melting point;
   heating the braze material and forming a transient liquid phase;
   transforming the transient liquid phase to a solid phase having a melting point higher than the second melting point, wherein the solid phase comprises copper, silver, zinc, magnesium, and at least one material selected from the group consisting of nickel, tin, cobalt, iron, phosphorous, indium, lead, antimony, cadmium, and bismuth, and wherein the solid phase comprises about 25% to about 35% zinc by weight; and
   bonding the cutting element pocket of the bit body to the cutting element with the solid phase.

2. The method of claim 1, wherein disposing a braze material between a cutting element pocket of a bit body and a cutting element to be disposed in the cutting element pocket comprises disposing a braze material comprising at least one intermetallic compound between the cutting element pocket of the bit body and the cutting element to be disposed in the cutting element pocket.

3. The method of claim 1, wherein disposing a braze material between a cutting element pocket of a bit body and a cutting element to be disposed in the cutting element pocket comprises disposing a braze material comprising a plurality of particles between the cutting element pocket of the bit body and the cutting element to be disposed in the cutting element pocket.

4. The method of claim 3, wherein disposing a braze material comprising a plurality of particles between a cutting element pocket of a bit body and a cutting element to be disposed in the cutting element pocket comprises disposing a braze material comprising a plurality of particles having an average particle size in a range from about 1 μm to about 15 μm between the cutting element pocket of the bit body and the cutting element to be disposed in the cutting element pocket.

5. The method of claim 1, wherein disposing a braze material between a cutting element pocket of a bit body and a cutting element to be disposed in the cutting element pocket comprises disposing a paste comprising at least one of the first composition or the second composition between the cutting element pocket of the bit body and the cutting element to be disposed in the cutting element pocket.

6. The method of claim 1, wherein disposing a braze material between a cutting element pocket of a bit body and a cutting element to be disposed in the cutting element pocket comprises disposing a foil comprising at least one of the first composition or the second composition between the cutting element pocket of the bit body and the cutting element to be disposed in the cutting element pocket.

7. The method of claim 1, wherein heating the braze material and forming a transient liquid phase comprises heating the braze material to a temperature in a range extending from about 200° C. to about 600° C.

8. The method of claim 1, further comprising, after the bonded cutting element pocket of the bit body and cutting element are used in an application, heating the solid phase to weaken the bond between the cutting element pocket of the bit body and the cutting element.

9. The method of claim 8, wherein heating the solid phase to weaken the bond between the cutting element pocket of the bit body and the cutting element comprises heating the solidified braze material to a temperature in a range extending from about 600° C. to about 800° C.

10. The method of claim 8, further comprising separating the cutting element from the cutting element pocket of the bit body.

11. The method of claim 1, wherein disposing a braze material between a cutting element of a bit body and a cutting element to be disposed in the cutting element pocket comprises after forming a joint between the cutting element of the bit body and the cutting element, disposing the braze material as a filler adjacent the previously formed joint between the cutting element pocket of the bit body and the cutting element.

12. The method of claim 1, wherein heating the braze material and forming a transient liquid phase comprises heating the braze material for at least about four hours.

13. The method of claim 1, wherein heating the braze material and forming a transient liquid phase comprises heating the braze material in an inert atmosphere.

14. A method, comprising:
   disposing a braze material adjacent and between a polycrystalline diamond material and
   a supporting substrate, wherein the braze material comprises a first composition having a first melting point and a second composition having a second melting point lower than the first melting point;
   heating the braze material and forming a transient liquid phase;
   transforming the transient liquid phase to a solid phase having a melting point higher than the second melting point, wherein the solid phase comprises copper, silver, zinc, magnesium, and at least one material selected from the group consisting of nickel, tin, cobalt, iron, phosphorous, indium, lead, antimony, cadmium, and bismuth, and wherein the solid phase comprises about 25% to about 35% zinc by weight; and bonding the polycrystalline diamond material to the substrate with the solid phase.

15. The method of claim 14, wherein disposing a braze material adjacent and between a polycrystalline diamond material and a supporting substrate comprises disposing a braze material comprising at least one intermetallic compound adjacent and between the polycrystalline diamond material and the supporting substrate.

16. The method of claim 14, wherein disposing a braze material adjacent and between a polycrystalline diamond material and a supporting substrate comprises disposing a braze material comprising a plurality of particles adjacent and between the polycrystalline diamond material and the supporting substrate.

17. The method of claim 16, where disposing a braze material comprising a plurality of particles adjacent and between a polycrystalline diamond material and a supporting substrate comprises disposing a braze material comprising a plurality of particles having an average particle size in a range from about 1 µm to about 15 µm adjacent and between the polycrystalline diamond material and the supporting substrate.

18. The method of claim 14, wherein heating the braze material and forming a transient liquid phase comprises heating the braze material to a temperature in a range extending from about 200° C. to about 600° C.

19. A method, comprising:
disposing a barrier material over at least a portion of at least one body selected from the group consisting of a cutting element pocket of a bit body and a cutting element to be disposed in the cutting element pocket;
disposing a braze material between the cutting element pocket of the bit body and the cutting element to be disposed in the cutting element pocket, wherein the braze material comprises a first composition having a first melting point and a second composition having a second melting point lower than the first melting point;
heating the braze material and forming a transient liquid phase;
transforming the transient liquid phase to a solid phase having a melting point higher than the second melting point, wherein the solid phase comprises copper, silver, zinc, magnesium, and at least one material selected from the group consisting of nickel, tin, cobalt, iron, phosphorous, indium, lead, antimony, cadmium, and bismuth, and wherein the solid phase comprises about 25% to about 35% zinc by weight; and
bonding the cutting element pocket of the bit body to the cutting element with the solid phase.

20. The method of claim 19, further comprising selecting the barrier material to comprise a carbide coating.

21. The method of claim 1, wherein the braze material comprises from 51% to 60% silver by weight.

22. The method of claim 1, wherein the braze material comprises from 5% to 18% copper by weight.

23. The method of claim 1, wherein the braze material comprises from 28% to about 35% zinc by weight.

* * * * *

UNITED STATES PATENT AND TRADEMARK OFFICE
CERTIFICATE OF CORRECTION

PATENT NO. : 9,731,384 B2
APPLICATION NO. : 14/584663
DATED : August 15, 2017
INVENTOR(S) : Wei Chen, Marc W. Bird and John H. Stevens Page 1 of 1

It is certified that error appears in the above-identified patent and that said Letters Patent is hereby corrected as shown below:

In the Specification
Column 3, Line 57, change "the teen "diamond"" to --the term "diamond"--

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*